United States Patent
Husband et al.

(10) Patent No.: US 7,825,552 B2
(45) Date of Patent: Nov. 2, 2010

(54) COOLING ARRANGEMENT FOR A VARIABLE RELUCTANCE ELECTRIC MACHINE

(75) Inventors: Stephen Mark Husband, Derby (GB); Geraint Wun Jewell, Sheffield (GB); Stuart Calverley, Sheffield (GB)

(73) Assignee: Rolls-Royce PLC, London (GB)

( * ) Notice: Subject to any disclaimer, the term of this patent is extended or adjusted under 35 U.S.C. 154(b) by 371 days.

(21) Appl. No.: 12/010,273

(22) Filed: Jan. 23, 2008

(65) Prior Publication Data
US 2008/0197725 A1 Aug. 21, 2008

(30) Foreign Application Priority Data
Feb. 16, 2007 (GB) ................... 0702996.0
Feb. 16, 2007 (GB) ................... 0703005.9

(51) Int. Cl.
H02K 1/32 (2006.01)
(52) U.S. Cl. ............... 310/59; 310/216.081; 310/65
(58) Field of Classification Search .......... 310/216.009, 310/81, 82, 125, 126, 65, 194, 214, 215, 310/216.081, 216.082, 216.125, 216.126, 310/59, 156.46, 156.47
See application file for complete search history.

(56) References Cited

U.S. PATENT DOCUMENTS

| | | | | |
|---|---|---|---|---|
| 4,670,696 A | * | 6/1987 | Byrne et al. | 318/701 |
| 5,148,090 A | * | 9/1992 | Oku et al. | 318/107 |
| 5,266,859 A | * | 11/1993 | Stanley | 310/216.012 |
| 5,705,874 A | * | 1/1998 | Grudl | 310/216.091 |
| 5,866,966 A | * | 2/1999 | Fulton | 310/214 |
| 6,008,563 A | * | 12/1999 | Baba et al. | 310/254.1 |
| 6,288,460 B1 | * | 9/2001 | Fakult et al. | 310/52 |
| 7,200,917 B2 | * | 4/2007 | Takano et al. | 29/596 |
| 2006/0108890 A1 | * | 5/2006 | Hauger et al. | 310/214 |
| 2006/0214522 A1 | | 9/2006 | Kawano | |
| 2006/0214523 A1 | | 9/2006 | Itoh | |

FOREIGN PATENT DOCUMENTS

| | | |
|---|---|---|
| EP | 0 414 507 A1 | 2/1991 |
| GB | 1 156 788 A | 7/1969 |
| GB | 1 246 353 | 9/1971 |
| GB | 2 087 163 A | 5/1982 |
| JP | A-63-018190 | 1/1988 |
| JP | A-08-275421 | 10/1996 |
| JP | A-10-271738 | 10/1998 |
| JP | A-11-332142 | 11/1999 |
| JP | A-2002-291200 | 10/2002 |
| JP | A-2003-009436 | 1/2003 |

* cited by examiner

Primary Examiner—Quyen Leung
Assistant Examiner—Naishadh N Desai
(74) Attorney, Agent, or Firm—Oliff & Berridge, PLC (57) ABSTRACT

A variable reluctance electric machine comprising a rotor and a stator; the stator having two or more electromagnetic windings and the rotor having a plurality of salient poles, the salient poles defining axially extending cooling fluid channels; wherein the salient poles and the cooling fluid channels are circumferentially skewed along at least a part of their length whereby in use the cooling fluid channels impel cooling fluid in a substantially axial direction towards the electromagnetic windings and the stator to facilitate heat transfer and dissipation from the windings.

18 Claims, 6 Drawing Sheets

COOLING ARRANGEMENT FOR A VARIABLE RELUCTANCE ELECTRIC MACHINE

The present invention relates to an improved cooling arrangement of an electric machine and is particularly concerned with directing a flow of cooling fluid through a variable reluctance electric machine and for cooling the electromagnetic windings of a variable reluctance electric machine.

One conventional method of directing a flow of cooling fluid through an electric machine is to utilise an airgap provided for mechanical clearance between the rotor and the stator and, in use, to impel air through the airgap. One disadvantage of this method is that the air may form a generally laminar layer which is poor for absorbing heat from surrounding components. A further disadvantage is the need for a cooling fan in addition to the rotor of the electric machine to impel cooling fluid along the airgap. Thus there is a weight increase associated with the additional component, which may be critical in some applications. Furthermore, for high-speed motors it is usually necessary to power the cooling fan externally rather than with the rotor, with the consequent increase in numbers of components and weight.

Figure 1:
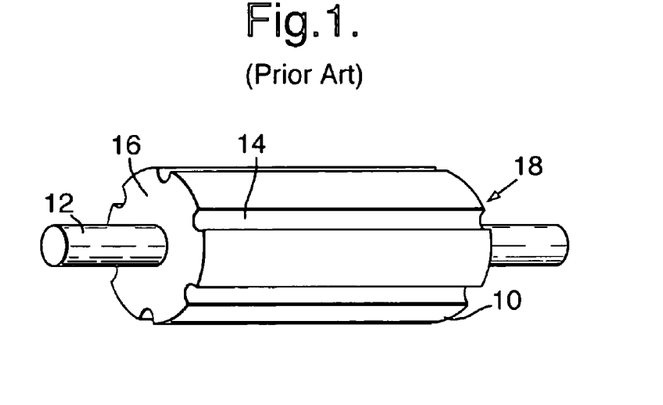
FIG. 1 is a perspective view of a rotor with axially aligned cooling fluid channels according to the prior art.

A further conventional method of directing a flow of cooling fluid through an electric machine, as described in GB 1,246,353, is to provide a rotor 10 mounted on an axial shaft 12, as shown in FIG. 1. The rotor 10 defines axially extending channels 14 adapted to receive a part of the cooling fluid at a first end 16 of the rotor 10 and to direct the flow axially towards a second end 18 of the rotor 10. A disadvantage of this method is that the channels 14 do not impart any component of axial flow and therefore external means, such as the cooling fan discussed above, is required to provide axial cooling flow.

Figure 2:
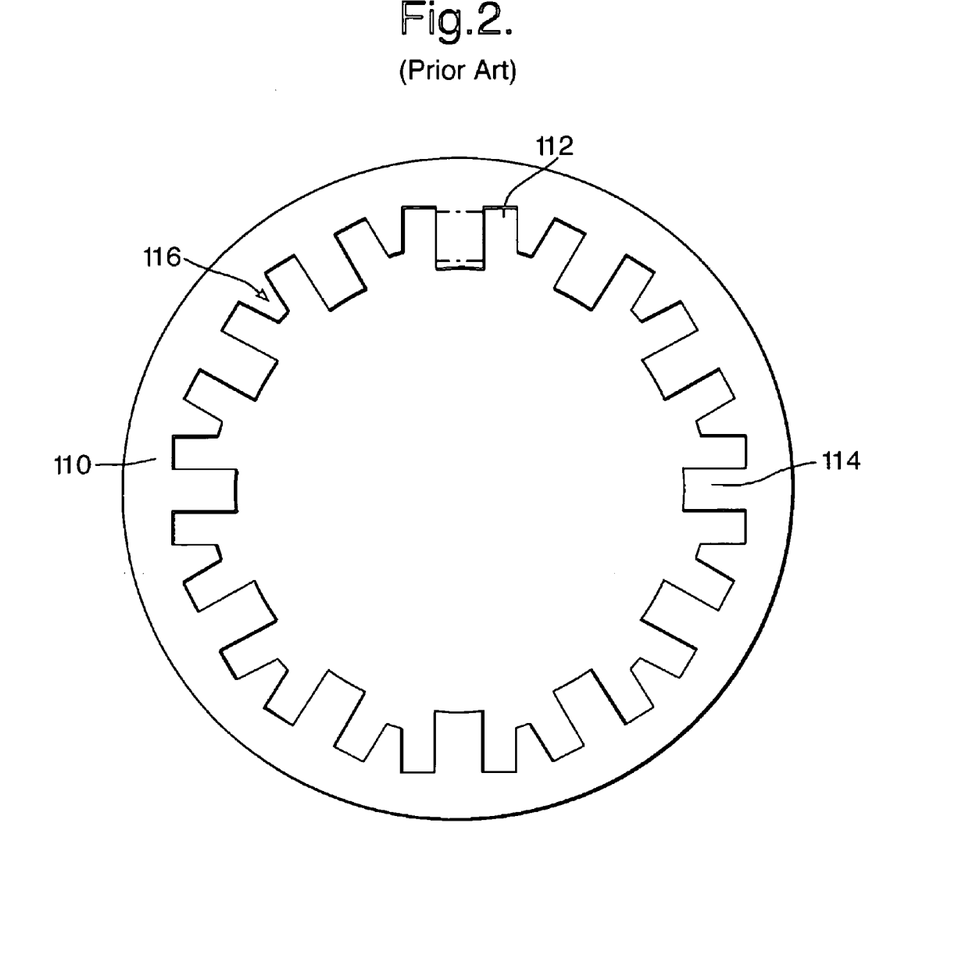
FIG. 2 is a cross section view of the stator arrangement of an electric machine according to the prior art.

One conventional method of cooling the windings of an electric machine, as described in EP 0,414,507 A1, is to provide radial projections 116 on the stator core laminations between adjacent windings 112 as shown in FIG. 2. These radial projections 116 provide some structural support to the windings 112 and increase the contact area between the windings 112 and the stator core 110. However, one disadvantage is that the stator core 110 is magnetic and this gives rise to flux leakage paths where some of the flux produced by the windings 112 takes a path from the stator teeth 114 to the projections 116 instead of traversing the air gap and taking a path through the rotor as intended. This flux leakage may also result in additional electromagnetic losses in the projections 116 and increased magnetic fluctuations around the windings 112 which reduce the efficiency of torque production. A second disadvantage is that the thermal conductivity of the projections 116 is limited to that of the stator core 110, around 30 $Wm^{-1}K^{-1}$.

A further disadvantage is that there is a requirement to provide electrical insulation between the windings 112 and the projections 116 and so an increased thermal resistance is introduced due to an electrically insulating slot liner. A slot liner of 0.2 to 0.5 mm thickness has a thermal conductivity of just 0.15 $Wm^{-1}K^{-1}$ which is poor even compared to the stator core 110. This conductivity may dominate the thermal performance of an electric machine, particularly at higher temperatures where winding losses are proportionally greater than at lower temperatures.

A further conventional method, in US 2006/0214522 A1 or US 2006/0214523 A1, has a cooling fan mounted on an axial end of a rotor and arranged to rotate with the rotor. This impels cooling air axially through the rotor in a direction that is inclined with respect to the radial direction of the rotor. One disadvantage of this method is the need for a cooling fan in addition to the rotor of the electric machine. Thus, there is a weight increase associated with the additional component, which may be critical in some applications. A further disadvantage lies in the applicability of this method to low-speed machines only, such as found in motor vehicles.

The present invention seeks to provide a novel cooling arrangement for directing a flow of cooling fluid which reduces, or preferably overcomes, the above mentioned problems.

Accordingly the present invention provides a variable reluctance electric machine comprising a rotor and a stator; the stator having two or more electromagnetic windings and the rotor having a plurality of salient poles, the salient poles defining axially extending cooling fluid channels; wherein the salient poles and the cooling fluid channels are circumferentially skewed along at least a part of their length whereby in use the cooling fluid channels provide a flow of cooling fluid in a substantially axial direction through the electric machine to facilitate heat transfer and dissipation from the electromagnetic windings.

Preferably first and second axial ends of the cooling fluid channels are in axial alignment to prevent axial thrust production.

Preferably the cooling fluid channels allow a flow of cooling fluid in a substantially radial direction towards at least one cooling channel defined in the stator.

Preferably the cooling fluid channels have a constant angle of circumferential skew.

Alternatively the cooling fluid channels have a varying angle of circumferential skew.

Preferably the cooling fluid channels comprise two or more sections each having a constant angle of circumferential skew.

Alternatively the cooling fluid channels comprise two or more sections each having a varying angle of circumferential skew.

Alternatively the cooling fluid channels comprise two or more sections, at least one section being axially aligned.

Preferably the cooling fluid channels comprise two or more sections, at least one section being axially aligned, circumferentially skewed at a constant angle or circumferentially skewed at a varying angle.

Preferably the stator having a stator core, two or more stator teeth extending radially therefrom and an electromagnetic winding around each of the stator teeth, wherein the stator has a cooling arrangement including at least one cooling region being defined between adjacent windings whereby in use the at least one cooling region is adapted to receive cooling fluid flow in a generally radial direction from the rotor and to direct it generally axially to facilitate heat transfer and dissipation from the electromagnetic windings.

Preferably the cooling region is divided into two or more cooling channels by at least one wall extending axially within at least a part of the cooling region.

Alternatively the cooling region is defined by a part of the stator core and a pair of generally radially extending walls adjacent to adjacent windings defining between their radially inner ends an axially extending aperture adapted to receive at least a part of the cooling fluid flow.

Alternatively the cooling region is defined by a part of the stator core and an axially extending U or V shaped wall defining at least one aperture at its radially inner end adapted to receive at least a part of the cooling fluid flow.

Alternatively the cooling region may be defined by a wall extending circumferentially between adjacent windings radially inwardly of the core and defining at least one aperture adapted to received at least a part of the cooling fluid flow.

Preferably at least one generally radially extending wall divides the cooling region extending between the stator core and the circumferentially extending wall into a plurality of axially extending channels.

Preferably the walls are integral with the stator core.

Alternatively the walls may be bonded to the stator core. Alternatively the walls are mechanically secured to the stator core.

Preferably the cooling region generally tapers in cross section.

The present invention will be more fully described by way of example with reference to the accompanying drawings, in which.

Figure 3:
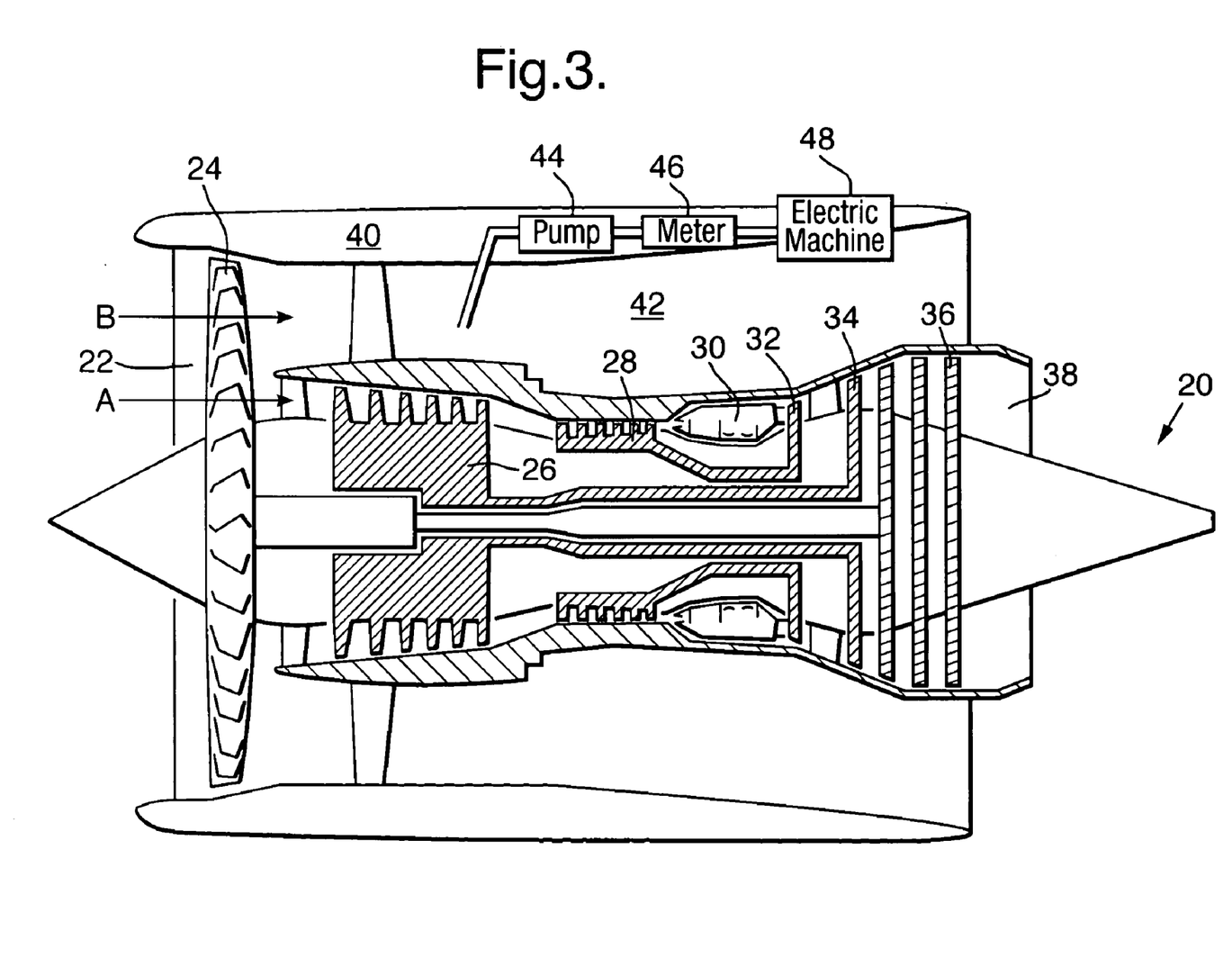
FIG. 3 is a sectional side view of a gas turbine engine.

A gas turbine engine 20 is shown in FIG. 3 comprising an air intake 22 and a propulsive fan 24 that generates two airflows A and B. The engine comprises, in axial flow A, an intermediate pressure compressor 26, a high pressure compressor 28, a combustor 30, a high pressure turbine 32, an intermediate pressure turbine 34, a low pressure turbine 36 and an exhaust nozzle 38. A nacelle 40 surrounds the engine 20 and defines, in axial flow B, a bypass duct 42. Air is extracted from the bypass duct 42 by a pump 44 and a metering arrangement 46. The pump 42 and metering arrangement 46 feed the air to an electric machine 48 according to the present invention.

A variable reluctance electric machine 48 according to the present invention comprises a rotor, a stator and two or more electromagnetic windings therebetween. In a preferred embodiment the stator is coaxial with and radially outward of the rotor.

Figure 4:
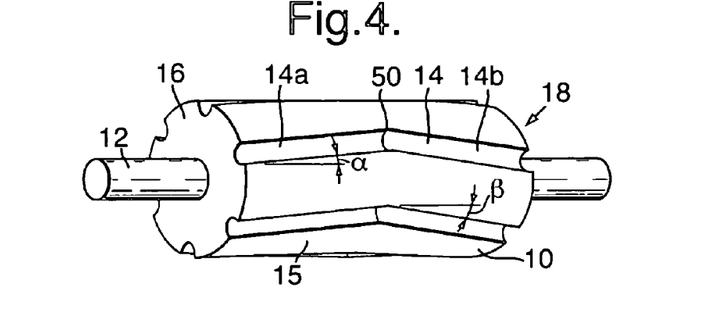
FIG. 4 is a perspective view of a rotor with cooling fluid channels in two sections circumferentially skewed at constant angles.

An exemplary embodiment of a rotor 10 of a variable reluctance electric machine 48, eg a switched reluctance electric machine, according to the present invention is shown in FIG. 4. The rotor 10 having a first end 16 and a second end 18 at opposite axial ends and the rotor 10 is mounted on an axial shaft 12. The rotor 10 defines one or more circumferentially spaced cooling fluid channels 14, which extend between the first and second axial ends 16 and 18. The channels 14 are further defined between circumferentially spaced salient poles 15 of the rotor 10. Each of the channels 14 of the annular array of circumferentially spaced cooling fluid channels 14 comprises a first section 14a extending between the first end 16 of the rotor 10 and a transition point 50 and a second section 14b extending between the transition point 50 and the second end 18 of the rotor 10. The first section 14a of the channel 14 being circumferentially skewed by a constant angle α and the second section 14b of the channel 14 being circumferentially skewed by a constant angle β such that the ends of the channel 14 at the first and second ends 16, 18 of the rotor 10 are in axial alignment, e.g. the ends of the channel 14 at the first and second ends 16 and 18 of the rotor are at the same angular or circumferential position on the rotor 10. The channels 14 are arranged to maintain smooth fluid communication at a constant flow rate. The axial alignment of the ends of the channel 14 is particularly advantageous in some applications since there is no net axial thrust created. The transition point 50 may be positioned to coincide with particular hot spots radially exterior to the rotor 10 so that cooling fluid is allowed to flow towards those hot spots to improve the efficiency of heat transfer. The transition point 50 is positioned to allow a flow of cooling fluid towards the stator and electromagnetic windings of the electric machine 48. Alternatively the transition point 50 may be aligned with cooling channels in the stator and other components exterior (not shown) to the rotor 10 in order to increase the efficiency of heat transfer away from the rotor 10.

In use the skewed cooling channels 14 provide the necessary degree of pitch to impart an axial component to the cooling fluid. This means that the external cooling fans required by prior electric machines are not required. Hence the present invention benefits from removing this component, and any motors or other components connected with its use, and a consequent reduction in weight. This also reduces potential failure modes and component maintenance requirements.

Figure 5:
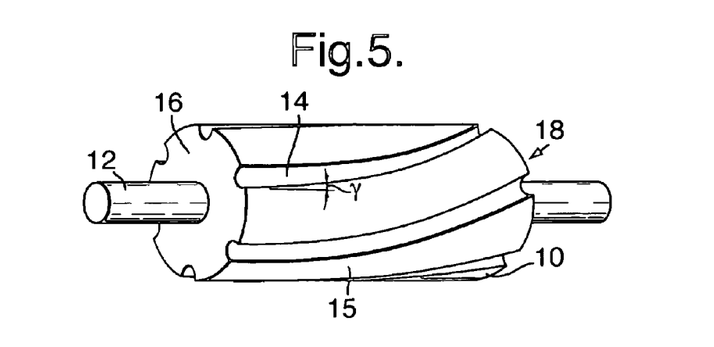
FIG. 5 is a perspective view of a rotor with cooling fluid channels circumferentially skewed at a varying angle.
Figure 6:
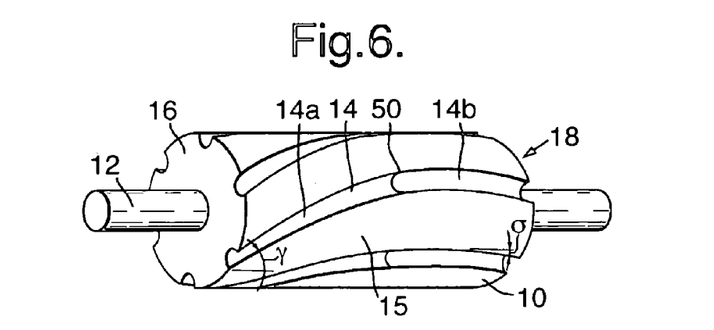
FIG. 6 is a perspective view of a rotor with cooling fluid channels in two sections circumferentially skewed at varying angles.

A second embodiment of a rotor 10 of a variable reluctance electric machine 48, eg a switched reluctance electric machines, according to the present invention is shown in FIG. 5 in which the channels 14 defined by the rotor 10 are circumferentially skewed at a variable angle γ. The variable angle of skew γ allows a smoother change to the direction of the flow of cooling fluid which may be advantageous in some applications. In this embodiment the end of the channel 14 at the second end 18 of the rotor 10 is displaced angularly or circumferentially relative to the end of the channel 14 at the first end 16 of the rotor 10.

A third embodiment of a rotor 10 of a variable reluctance electric machine 48, eg a switched reluctance electric machine, according to the present invention is shown in FIG. 5 in which the channels 14 defined by the rotor 10 comprise two sections, 14a and 14b. A first section 14a of the channel 14 is circumferentially skewed at a variable angle γ between the first end 16 of the rotor 10 and the transition point 50. A second section 14b of the channel 14 is circumferentially skewed at a variable angle δ between the transition point 50 and the second end 18 of the rotor 10. As in the first embodiment, there is no discontinuity created in the flow by the transition point 50. The ends of the channel 14 at the first and second ends 16 and 18 of the rotor 10 may be axially aligned, e.g. arranged at the same angular or circumferential position on the rotor 10, to reduce or prevent the production of net axial thrust. The transition points 50 are positioned to allow of cooling fluid towards the stator and electromagnetic windings of the electric machine 48. The transition point 50 may be positioned to coincide with particular hot spots radially exterior to the rotor 10 so that cooling fluid is allowed to flow towards those hot spots to improve the efficiency of heat transfer. Alternatively the transition point 50 may be aligned with cooling channels in the stator and other components (not shown) exterior to the rotor 10 in order to increase the efficiency of heat transfer away from the rotor 10.

Figure 7:
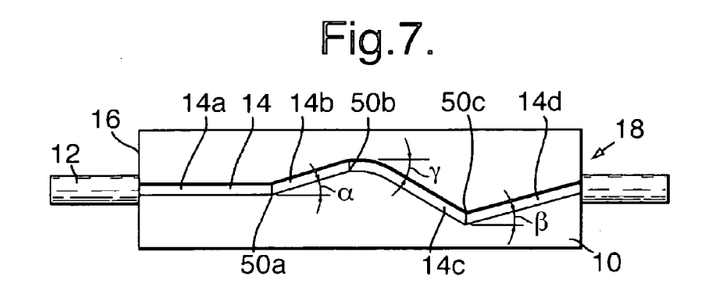
FIG. 7 is a side view of a rotor with a cooling fluid channel in four sections showing a combination of skew angles and types.

A fourth embodiment of a rotor 10 of a variable reluctance electric machine 48, eg a switched reluctance electric machine, according to the present invention is shown in FIG. 7 and comprises a rotor 10 mounted on an axial shaft 12. The rotor 10 defining channels 14 (only one channel 14 is shown to aid clarity) between the first and second ends 16 and 18 of the rotor 10. The channel 14 is in four sections 14a, 14b, 14c and 14d. The first section 14a of the channel 14 is axially aligned between the first axial end 16 of the rotor 10 and a first transition point 50a. The second section 14b of the channel 14 is circumferentially skewed at a constant angle α between the first transition point 50a and a second transition point 50b. The third section 14c of the channel 14 is circumferentially skewed by a variable angle γ between the second transition point 50b and a third transition point 50c. The final section 14d of the channel 14 is circumferentially skewed at a constant angle β between the third transition point 50c and the second axial end 18 of the rotor 10. The ends of the channel 14 are axially aligned to reduce or prevent production of net axial thrust, which may be advantageous for some applications. The transition points 50a, 50b and 50c are positioned to allow a flow of cooling fluid towards the stator and electromagnetic windings of the electric machine 48. The transition points 50a, 50b and 50c may be positioned to coincide with particular hot spots radially exterior to the rotor 10 so that cooling fluid is allowed to flow towards those hot spots to improve the efficiency of heat transfer. Alternatively the transition points 50 may be aligned with cooling channels in the stator and other components (not shown) exterior to the rotor 10 in order to increase the efficiency of heat transfer away from the rotor 10.

Figure 8:
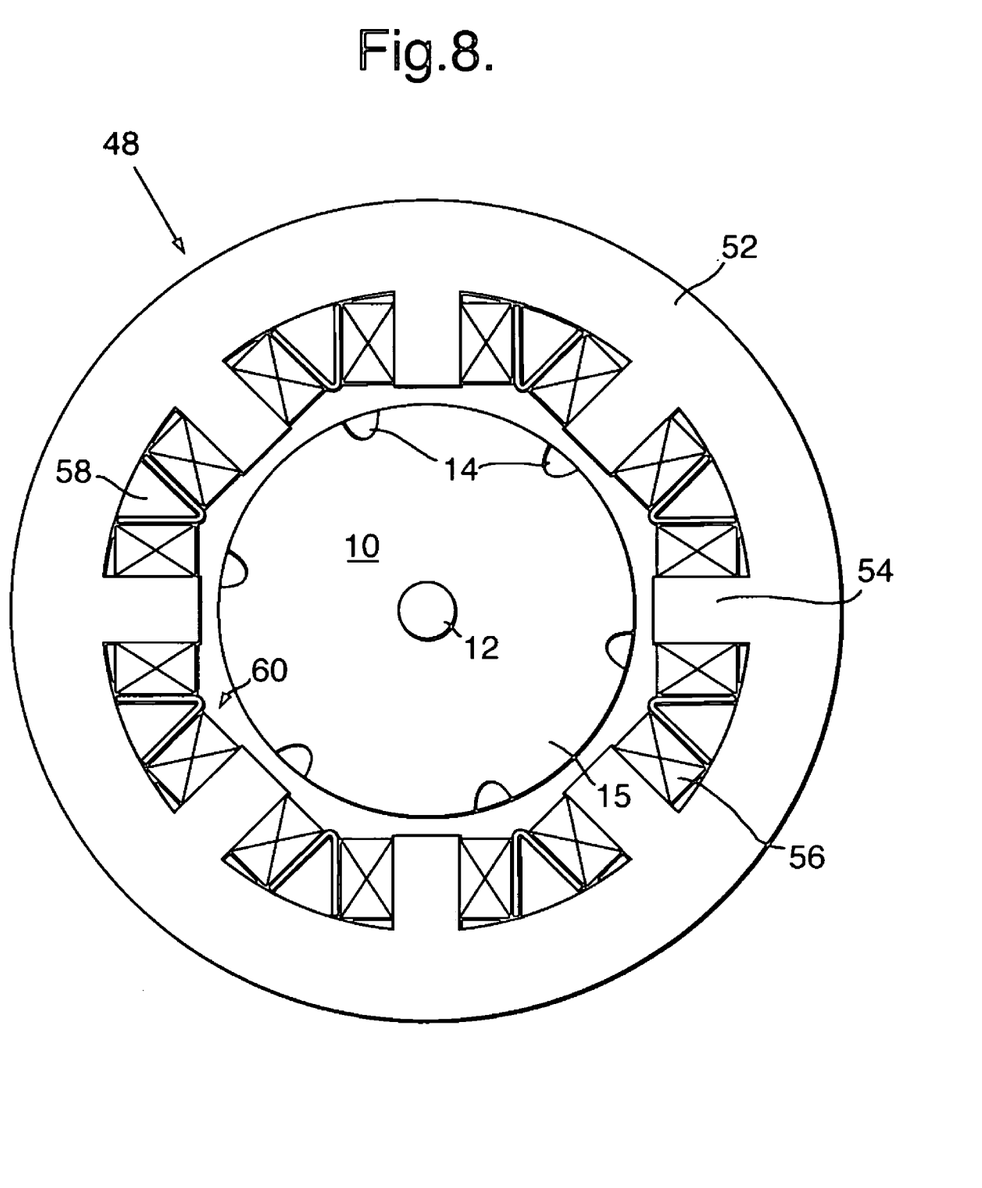
FIG. 8 is an end view of an electric machine according to the present invention.

An arrangement of a switched selective reluctance electric machine 48 according to the present invention is shown in FIG. 8. A rotor 10 mounted on an axial shaft 12 defines cooling fluid channels 14 between salient poles 15 of the rotor 10 as described in any of the above embodiments. Radially outward of the rotor is a stator comprising a stator core 52 from which extend radially inwardly stator teeth 54. The stator teeth 54 form a circumferential array. Around each stator tooth 54 are electromagnetic windings 56. Between adjacent windings 56 are defined cooling regions 58 which may take any appropriate form. There is an airgap 60 defined between the rotor 10 and stator. In use, the channels 14 defined in the rotor 10 allow cooling fluid to flow radially across the airgap 60 towards the stator and electromagnetic windings 56. The cooling regions 58 are adapted to receive the flow of cooling fluid and to direct it axially along the cooling regions 58 to one or both of the axial ends of the electric machine 48 to facilitate heat transfer and dissipation from the windings 56.

Although the arrangement shown in FIG. 8 has eight poles on the stator and six poles on the rotor this is by way of example only. Other suitable combinations of numbers of stator and rotor poles, ensuring there are different numbers of poles on each to yield continuous torque, may be used including twelve/eight, six/four, eighteen/twelve. The clearance between the rotor and the stator is typically less than 0.5 mm but this may be chosen as befits the specific application.

Cooling fluid may be provided from any suitable source as appropriate for the application. In a preferred embodiment the variable reluctance electric machine may be an electric motor, an electric starter or an electric generator embedded on one or more spools of a gas turbine engine to replace oil-cooled, gear-driven, externally mounted generators currently used. In this case the cooling fluid is air from a gas turbine engine bypass duct 42. However, in other cases the cooling fluid may be compressed air from a compressor, oil, water or any other cooling fluid that is available and compatible with the materials envisaged.

The cooling fluid channel 14 comprising four sections shown in FIG. 7 is given by way of example only. The channels 14 could comprise any number of sections whereby the channel sections are in fluid communication. Each section of the channel 14 may be axially aligned, circumferentially skewed at a constant angle or circumferentially skewed at a variable angle. The channel 14 may comprise any combination of sections. Preferably the axial ends of the channels 14 are axially aligned to reduce or prevent production of net axial thrust. Alternatively there may be a net skew between the axial ends of the channel 14. Preferably the annular array of circumferentially spaced cooling fluid channels 14 comprises a plurality of identically profiled channels 14. Alternatively the plurality of channels 14 are differently profiled.

The channels have been shown with a U shaped cross section. However, it will be understood by one skilled in the art that the channels may have a different cross section, for example rectangular, hemispherical or V shaped. The channels may be partially enclosed by the rotor body, which may define apertures to provide fluid communication between the channels and the airgap and stator radially outward of the rotor. It will also be understood by one skilled in the art that bypass air from a gas turbine is used by way of example only. The invention can also be applied to electric machines wherever they occur.

The present invention is particularly useful in switched reluctance, e.g. salient pole, electrical machines wherein the channels are defined between the poles of the salient rotor. The use of salient poles on the rotor to define the channels provides the required cooling fluid throughout the electrical machine and removes the requirement to provide additional forced cooling equipment, e.g. a fan, and this reduces the weight, volume and cost of the electrical machine.

In addition it is preferable to change the skew of the stator and electromagnetic windings so that it corresponds to the rotor such that all stator and rotor pole regions of the electrical machine come into magnetic alignment simultaneously to maintain electromagnetic torque capability. Although the channels of the present invention may be provided on a skewed rotor in combination with a non-skewed stator, the significant reduction in electromagnetic torque caused by this arrangement makes it preferable to match the stator skew to that of the rotor.

Figure 9:
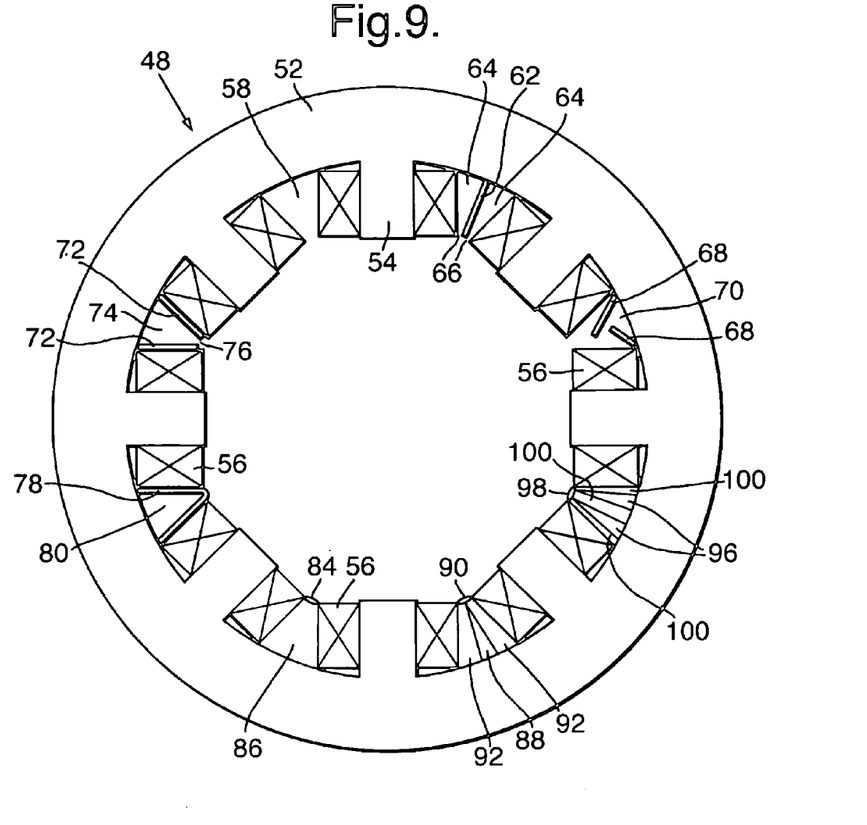
FIG. 9 is a cross section view of the stator arrangement of an electric machine according to the present invention showing eight embodiments.

Embodiments of the stator arrangement of the present invention are illustrated in FIG. 9 in which a stator arrangement of a variable reluctance electric machine 48 comprises a stator core 52 with a plurality of circumferentially spaced stator teeth 54 extending generally radially inwardly from the stator core 52 to form an annular array of stator teeth 54. Electromagnetic windings 56 are provided around each of the stator teeth 54. There are shown eight different embodiments of a cooling region. In a first embodiment, a cooling region 58 is defined between adjacent windings 56. The cooling region 58 is adapted to receive air in a generally radial direction from the rotor and to direct the air generally axially along the cooling region 58 to one or both of the axial ends of the stator core 52 to facilitate heat transfer and dissipation from the windings 56.

A second embodiment of the cooling region is shown in FIG. 9 and comprises an axially extending wall 62 extending in a generally radial direction inwardly from the stator core 52. The wall 62 bisects the cooling region into two cooling channels 64 which may be of equal or different cross-sectional area. The cooling channels 64 are adapted to receive air in a generally radial direction through apertures 66 from the rotor and to direct the air generally axially along the cooling channels 64 to one or both of the axial ends of the stator core 52 to facilitate heat transfer and dissipation from the windings 56.

A third embodiment of the cooling region is shown in FIG. 9 and comprises two axially extending walls 68 defining cooling channels 70 within the cooling region. The walls 68 extend from the stator core 52, another wall 68 or a winding 56 towards another wall 68, a winding 56 or the radially inner extent of the cooling region. There may be defined slot-like apertures between walls 68 to provide fluid communication between channels 70. Alternatively the walls 68 may define at least one aperture to interconnect the channels 70 and allow a flow of air therebetween. The channels 70 are adapted to receive air in a generally radial direction from the rotor and to direct the air generally axially along the cooling channels 70 to one or both of the axial ends of the stator core 52 to facilitate heat transfer and dissipation from the windings 56.

Figure 10:
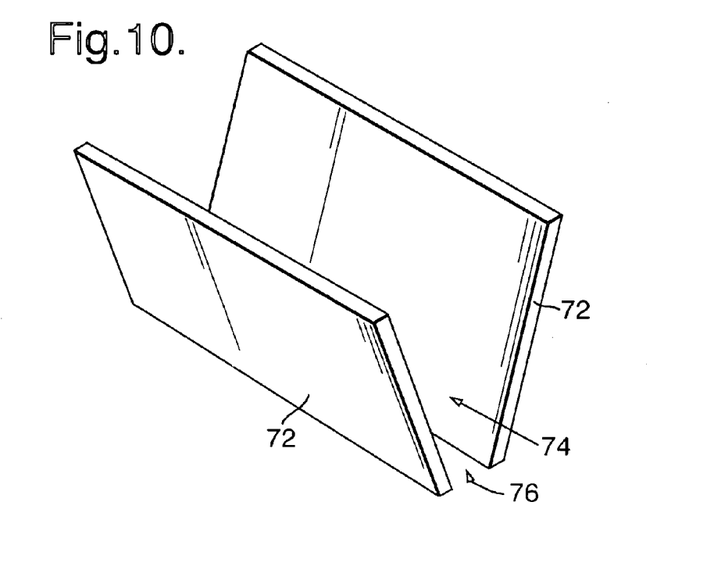
FIG. 10 is a perspective view of a fourth embodiment of a cooling region.

A fourth embodiment of the cooling region is shown in FIG. 9 and comprises a pair of walls 72 extending generally radially inwardly from the stator core 52 between adjacent windings 56 to define the cooling region between the walls 72. The walls 72 define a radially tapering axially extending channel 74 therebetween, and define a slot-like aperture 76 radially between their inner ends. The walls 72 defining the tapering channel 74 and aperture 76 can be seen in the perspective enlargement of FIG. 10. The aperture 76 and channel 74 are adapted to receive air in a generally radial direction from the rotor and to direct the air generally axially along the channel 74 to one or both of the axial ends of the stator core 52 to facilitate heat transfer and dissipation from the windings 56.

Figure 11:
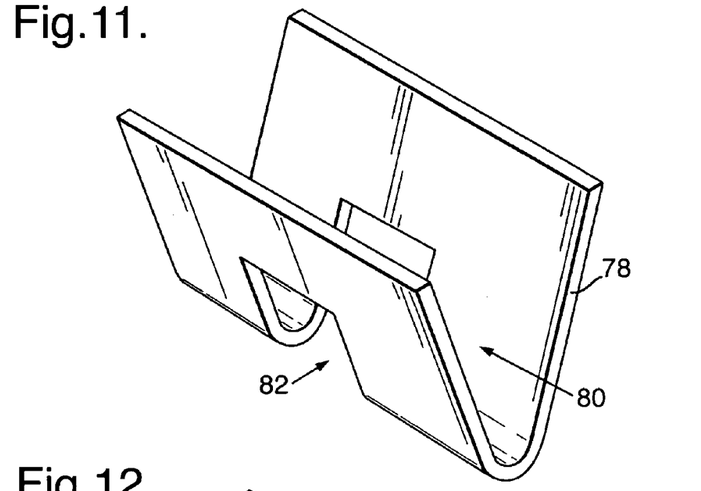
FIG. 11 is a perspective view of a fifth embodiment of a cooling region.

A fifth embodiment of the cooling region is shown in FIG. 9 and in perspective enlargement in FIG. 11. A wall 78, U- or V-shaped in cross section, extends generally radially inwardly from the stator core 52 between adjacent windings 56 and defines a radially tapering axially extending channel 80 in the cooling region. At least one aperture 82 is defined at the radially inner region of the wall 78 and is adapted to receive air in a generally radial direction. The channel 80 defined by the wall 78 directs the air in a generally axial direction along the channel 80 to one or both of the axial ends of the stator core 52 to facilitate heat transfer and dissipation from the windings 56.

A sixth embodiment of the cooling region is shown in FIG. 9 and comprises a circumferentially extending wall 84 extending between adjacent windings 56. The wall 84 defines at least one aperture or slot adapted to receive air in a generally radial direction. A channel 86 is defined between the wall 84, the stator core 52 and the windings 56. The channel 86 directs air in a generally axial direction to one or both of the axial ends of the stator core 52 to facilitate heat transfer and dissipation from the windings 56.

Figure 12:
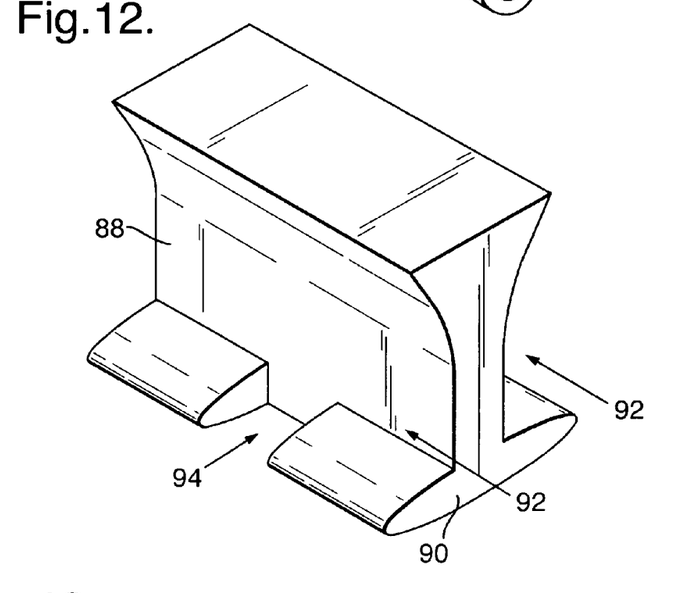
FIG. 12 is a perspective view of a seventh embodiment of a cooling region.

A seventh embodiment of the cooling region is shown in FIG. 9 and in perspective enlargement in FIG. 12. A wall 88 extends radially inwardly from the stator core 52 towards a wall 90 extending circumferentially at the radially inner end of wall 88. The walls 88, 90, stator core 52 and windings 56 define two radially tapering axially extending channels 92. The wall 90 defines at least one aperture or slot 94 adapted to receive air in a generally radial direction. The wall 88 may define at least one aperture to interconnect the channels 92 and allow a flow of air therebetween. The channels 92 direct the air in a generally axial direction along the channels 92 to one or both of the axial ends of the stator core 52 to facilitate heat transfer and dissipation from the windings 56.

An eighth embodiment of the cooling region has two or more radially extending walls 96 and a wall 98 extending circumferentially at the radially inner ends of the walls 96 between adjacent windings 56 defining therebetween three or more cooling channels 100. As in the seventh embodiment, the wall 98 defines at least one aperture to receive air in a generally radial direction. Each of the walls 96 may define at least one aperture to interconnect the channels 100 and allow a flow of cooling fluid therebetween. The channels 100 are adapted to direct the air in a generally axial direction along the channels 100 to one or both of the axial ends of the stator core 52 to transfer and dissipate the heat generated in the windings 56.

It is preferred that the cooling fluid flows radially outwardly to a mid region of the cooling channels and then flows axially along the channels to both axial ends of the stator core.

Cooling fluid may be provided from any suitable source as appropriate for the application. In a preferred embodiment the electric machine may be an electric motor, an electric starter or an electric generator embedded on one or more spools of a gas turbine engine to replace oil-cooled, gear-driven, externally mounted generators currently used. In this case the cooling fluid may be air from the bypass duct 42. However, in other cases the fluid may be compressed air from a compressor, oil, water or any other cooling fluid that is available and compatible with the materials envisaged.

Figure 13:
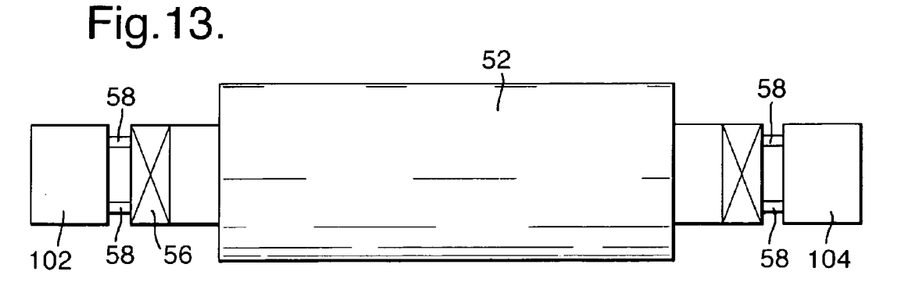
FIG. 13 is a longitudinal view of a stator arrangement of an electric machine showing inlet and outlet manifolds.

The cooling regions 58 and channels may be in fluid communication with an inlet manifold 102, as shown in FIG. 13, to ensure a constant, even and sufficient supply of cooling fluid. The inlet manifold 102 may take the form of a supply reservoir, at least one upstream duct to pass the cooling fluid along or any other appropriate means. The cooling fluid may be metered by any appropriate metering means 44 upstream of the inlet to the cooling channels to regulate the flow of cooling fluid to that required for the speed of the electric machine. Similarly, the channels may be in fluid communication with an outlet manifold 104 to facilitate heat transfer away from the electric machine. This may take the form of a heat sink, at least one downstream duct to pass the cooling fluid along or any other appropriate means.

The walls defining the cooling channels may be integral with the stator core. Alternatively a suitable bonding agent, for example a high temperature adhesive, may bond the walls to the stator core. Alternatively the walls may be secured to the stator core by mechanical means, for example by providing dovetail slots in the stator core and dovetail shapes on the walls or vice versa.

Although the invention has been described with the stator comprising axially aligned cooling channels the benefits may be equally derived with skewed channels. This configuration is particularly beneficial when used in combination with the skewed rotor so that the stator and rotor poles always align simultaneously and electromagnetic torque capacity is not reduced.

Although FIG. 9 has shown eight embodiments of the cooling region on a single stator core, it is to be appreciated by a person skilled in the art that a practical electrical machine will only have one of the types of cooling region between each pair of adjacent electromagnetic windings on the stator core.

It will be understood by one skilled in the art that bypass air from a gas turbine is used by way of example only. The invention may also be applied to electric machines wherever they occur.

We claim:

1. A variable reluctance electric machine comprising:
    a rotor having a plurality of salient poles, the salient poles defining axially extending cooling fluid channels; and
    a stator, the stator having:
    a stator core,
    two or more stator teeth extending radially from the stator core; and
    two or more electromagnetic windings, each electromagnetic winding winds around one of the stator teeth, wherein the stator has a cooling arrangement including at least one cooling region being defined between adjacent windings, the at least one cooling region comprising circumferentially skewed channels, wherein
    the salient poles and the cooling fluid channels are circumferentially skewed along at least a part of their length whereby in use the cooling fluid channels provide a flow of cooling fluid in a substantially axial direction through the electric machine to facilitate heat transfer and dissipation from the electromagnetic windings, and
    the at least one cooling region comprising skewed channels is adapted to receive cooling fluid flow in a generally radial direction from the rotor and to direct it generally axially to facilitate heat transfer and dissipation from the electromagnetic windings.

2. A variable reluctance electric machine as in claim 1 wherein first and second axial ends of the cooling fluid channels are in axial alignment to prevent axial thrust production.

3. A variable reluctance electric machine as in claim 1 wherein the cooling fluid channels allow a flow of cooling fluid in a substantially radial direction towards at least one cooling channel defined in the stator.

4. A variable reluctance electric machine as in claim 1 wherein the cooling fluid channels have a constant angle of circumferential skew.

5. A variable reluctance electric machine as in claim 1 wherein the cooling fluid channels have a varying angle of circumferential skew.

6. A variable reluctance electric machine as in claim 1 wherein the cooling fluid channels comprise two or more sections each section having a constant angle of circumferential skew.

7. A variable reluctance electric machine as in claim 1 wherein the cooling fluid channels comprise two or more sections, each section having a varying angle of circumferential skew.

8. A variable reluctance electric machine as in claim 6 wherein the cooling fluid channels comprise two or more sections, at least one section being axially aligned.

9. A variable reluctance electric machine as in claim 1 wherein the cooling fluid channels comprise two or more sections, at least one section being axially aligned, circumferentially skewed at a constant angle or circumferentially skewed at a varying angle.

10. A variable reluctance electric machine as claimed in claim 1 wherein the cooling region is divided into two or more cooling channels by at least one wall extending axially within at least a part of the cooling region.

11. A variable reluctance electric machine as claimed in claim 1 wherein the cooling region is defined by a part of the stator core and a pair of generally radially extending walls adjacent to adjacent windings defining between their radially inner ends an axially extending aperture adapted to receive at least a part of the cooling fluid flow.

12. A variable reluctance electric machine as claimed in claim 1 wherein the cooling region is defined by a part of the stator core and an axially extending U or V shaped wall defining at least one aperture at its radially inner end adapted to receive at least a part of the cooling fluid flow.

13. A variable reluctance electric machine as claimed in claim 1 wherein the cooling region is defined by a wall extending circumferentially between adjacent windings radially inwardly of the core and defining at least one aperture adapted to receive at least a part of the cooling fluid flow.

14. A variable reluctance electric machine as claimed in claim 13 wherein at least one generally radially extending wall divides the cooling region extending between the stator core and the circumferentially extending wall into a plurality of axially extending channels.

15. A variable reluctance electric machine as claimed in claim 1 wherein the walls are integral with the stator core.

16. A variable reluctance electric machine as claimed in claim 1 wherein the walls are bonded to the stator core.

17. A variable reluctance electric machine as claimed in claim 1 wherein the walls are mechanically secured to the stator core.

18. A variable reluctance electric machine as claimed in claim 1 wherein the cooling region generally tapers in cross section.

* * * * *